United States Patent
Logan et al.

(10) Patent No.: US 8,508,532 B1
(45) Date of Patent: Aug. 13, 2013

(54) POSITIONING OF DISPLAY ELEMENTS

(75) Inventors: Bryan Logan, Kitchener (CA); Keith Stanger, Waterloo (CA)

(73) Assignee: Google Inc., Mountain View, CA (US)

( * ) Notice: Subject to any disclaimer, the term of this patent is extended or adjusted under 35 U.S.C. 154(b) by 239 days.

(21) Appl. No.: 13/216,343

(22) Filed: Aug. 24, 2011

(51) Int. Cl.
| | |
|---|---|
| G06T 11/20 | (2006.01) |
| G09G 5/00 | (2006.01) |
| G06F 17/00 | (2006.01) |
| G06F 3/048 | (2013.01) |
| G06F 17/20 | (2006.01) |
| G06F 17/21 | (2006.01) |

(52) U.S. Cl.
USPC ........... 345/440; 345/619; 345/629; 345/672; 345/676; 715/234; 715/236; 715/804

(58) Field of Classification Search
None
See application file for complete search history.

(56) References Cited

U.S. PATENT DOCUMENTS

| | | | | |
|---|---|---|---|---|
| 6,054,985 | A * | 4/2000 | Morgan et al. | 715/804 |
| 6,314,424 | B1 | 11/2001 | Kaczmarski et al. | |
| 7,458,019 | B2 * | 11/2008 | Gumz et al. | 715/234 |
| 2004/0237049 | A1 * | 11/2004 | Pletcher et al. | 715/760 |
| 2005/0185920 | A1 * | 8/2005 | Harper et al. | 386/52 |
| 2008/0238922 | A1 * | 10/2008 | Rhodes et al. | 345/440 |

* cited by examiner

Primary Examiner — Maurice L. McDowell, Jr.
Assistant Examiner — Donna Ricks
(74) Attorney, Agent, or Firm — Young Basile Hanlon & MacFarlane P.C.

(57) ABSTRACT

Systems and methods for positioning display elements are disclosed. One aspect of the disclosed embodiments is a method of positioning a set of display elements on a display. The method includes obtaining a hierarchy of nested wrapper elements, each display element in the set of display elements located within one of the nested wrapper elements, identifying visible and hidden subsets of display elements, and positioning the visible subset of display elements adjacent to each other by translating the wrapper elements of display elements in at least one of the hidden subset of display elements or the visible subset of display elements by a pre-determined distance so that each display element in the hidden subset of display elements becomes positioned at least one of behind one or more display elements in the visible subset of display elements or outside of a visible area of the display.

20 Claims, 8 Drawing Sheets

120 —

```
...
<div class = "MENU">  — 122
    <div class = "WRAPPER_ELEMENT_N">  — 124a
        <div class = "WRAPPER_ELEMENT_N-1">  — 124b
            ...
            <div class = "WRAPPER_ELEMENT_0">  — 124c
                <div class = "DISPLAY_ELEMENT_0">  — 126c
                </div>
            </div>
            ...
            <div class = "DISPLAY_ELEMENT_N-1">  — 126b
            </div>
        </div>
        <div class = "DISPLAY_ELEMENT_N">  — 126a
        </div>
    </div>
</div>
...
```

130 —

```
...
.MENU  {  — 132
    pointer-events:   none;
}

.DISPLAY_ELEMENT_N,
.DISPLAY_ELEMENT_N-1,  — 134
    ...
.DISPLAY_ELEMENT_0  {
    pointer-events:   all;
}
...
```

*FIG. 8*

POSITIONING OF DISPLAY ELEMENTS

TECHNICAL FIELD

The present invention relates in general to a graphical user interface and in particular to positioning of display elements.

BACKGROUND

The Internet is a global system of interconnected computer networks. The Internet carries various information resources and services, including the World Wide Web (WWW). The WWW is a client-server model that includes web servers that provide access to documents via Hypertext Transfer Protocol (HTTP). Documents on the web servers are identified using Uniform Resource Locations (URLs). The documents and other content provided by web servers can be accessed by clients by way of a web browser application.

The documents and other content can include web pages or web applications created using Hyper Text Markup Language (HTML) or other markup languages. Some web browsers are capable of rendering web pages or web applications in a certain way using one or more Cascading Style Sheets (CSS) referenced by the web pages or web applications.

SUMMARY

Disclosed herein are embodiments of methods and systems for positioning of display elements.

One aspect of the disclosed embodiments is a method of positioning a visible subset of display elements selected from a set of display elements on a display. The method includes obtaining a hierarchy of nested wrapper elements, each display element in the set of display elements located within one of the nested wrapper elements, and at least some of the wrapper elements having a parent wrapper element. The method further includes identifying a visible subset of display elements selected from the set of display elements and a hidden subset of display elements selected from the set of display elements and positioning the visible subset of display elements adjacent to each other using a processor by translating the wrapper elements of display elements in at least one of the hidden subset of display elements or the visible subset of display elements by a pre-determined distance so that each translated display element in the hidden subset of display elements becomes positioned at least one of behind one or more display elements in the visible subset of display elements or outside of a visible area of the display.

Another aspect of the disclosed embodiments is a method of generating a web document enabling a client to position a visible set of display elements selected from a total set of display elements on a display. The method includes creating a hierarchy of nested wrapper elements using a processor, at least some of the wrapper elements having a parent wrapper element, locating each display element in the total set of display elements within one of the nested wrapper elements, and configuring each wrapper element having a parent wrapper element so that the wrapper element's display element will be hidden behind its parent wrapper's display element if both display elements occupy a same position.

Another aspect of the disclosed embodiments is a computing system for positioning a visible subset of display elements selected from a set of display elements on a display. The computing system includes at least one memory and at least one processor configured to execute instructions stored in the at least one memory to obtain a hierarchy of nested wrapper elements, each display element in the set of display elements located within one of the nested wrapper elements, and at least some of the wrapper elements having a parent wrapper element. The at least one processor is further configured to identify a visible subset of display elements selected from the set of display elements and a hidden subset of display elements selected from the set of display elements and position the visible subset of display elements adjacent to each other by translating the wrapper element of display elements in at least one of the hidden subset of display elements or the visible subset of display elements by a pre-determined distance so that each display element in the hidden subset of display elements becomes positioned at least one of behind one or more display elements in the visible subset of display elements or outside of a visible area of the display.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein:

FIG. 8 includes exemplary Hyper Text Markup Language and Cascading Style Sheets illustrative of one implementation of the container of FIG. 3 according to embodiments of the disclosed subject matter.

DETAILED DESCRIPTION

Figure 1:
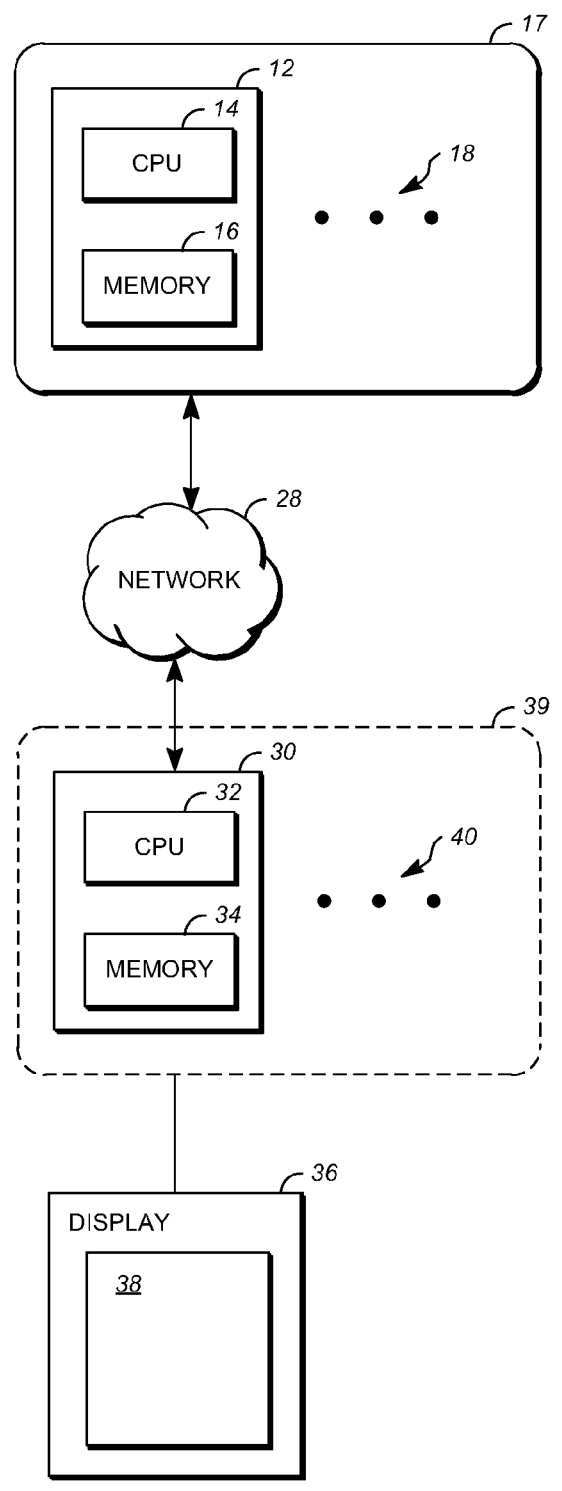
FIG. 1 is a diagram of a client-server computing scheme according to embodiments of the disclosed subject matter.

FIG. 1 is a diagram of a client-server system 10. Server 12 can be, for example, a computer having an internal configuration of hardware including a processor such as a central processing unit (CPU) 14 and a memory 16. CPU 14 can be a controller for controlling the operations of server 12. The CPU 14 is connected to memory 16 by, for example, a memory bus. Memory 16 can include random access memory (RAM) or any other suitable memory device. Memory 16 can store data and program instructions which are used by the CPU 14. Other suitable implementations of server 12 are possible.

The server 12 can be the only server or can be one of a group of servers 17 that includes additional servers 18. The group of servers 17 can be implemented as a computing cluster wherein the server 12 and additional servers 18 share resources, such as storage memory, and load-balance the processing of requests to the group of servers 17. The group of servers 17 can alternatively be a cloud computing service. For example, a cloud computing service can include hundreds or thousands of servers configured to provide scalable computing resources. In a cloud computing service, computing tasks can be performed on one or more servers or other computing devices included within the cloud computing service.

The above are only exemplary implementations of the group of servers 17, and any distributed computing system can be used in their place. As used herein and in the claims, the term "server" is understood to include any combination or implementation of servers, server groups, or any other configuration of computing devices or systems of any kind.

A network 28 connects the group of servers 17 to a client 30 and any additional clients 40 in a group of clients 39. Network 28 is, for example, the Internet. Network 28 can also be a local area network (LAN), wide area network (WAN), virtual private network (VPN), or any other means of transferring data between the group of servers 17 and group of clients 39.

The client 30, in one example, can be a desktop computer having an internal configuration of hardware including a processor such as a central processing unit (CPU) 32 and a memory 34. CPU 32 is a controller for controlling the operations of client 30. CPU 32 can be connected to memory 34 by, for example, a memory bus. Memory 34 may be RAM or any other suitable memory device. Memory 34 stores data and program instructions which are used by CPU 32. Other suitable implementations of client 30 are possible, including handheld computing devices, laptops, or mobile telephones.

A display 36 configured to display a graphical user interface can be connected to client 30. Display 36 may be implemented in various ways, including by a liquid crystal display (LCD) or a cathode-ray tube (CRT). Alternatively, the display can be virtual, for example, as implemented in a remote desktop application system. The display 36 can be configured to display application windows including a web browser application window 38 on client 30.

Other implementations of the client-server system 10 are possible. For example, one implementation can omit the group of servers 17 and additional servers 18 and include only a single server 12. In another implementation, there may only be one client 30 instead of the group of clients 39 and additional clients 40. In another implementation, additional components may be added to the client-server system 10.

Figure 2:
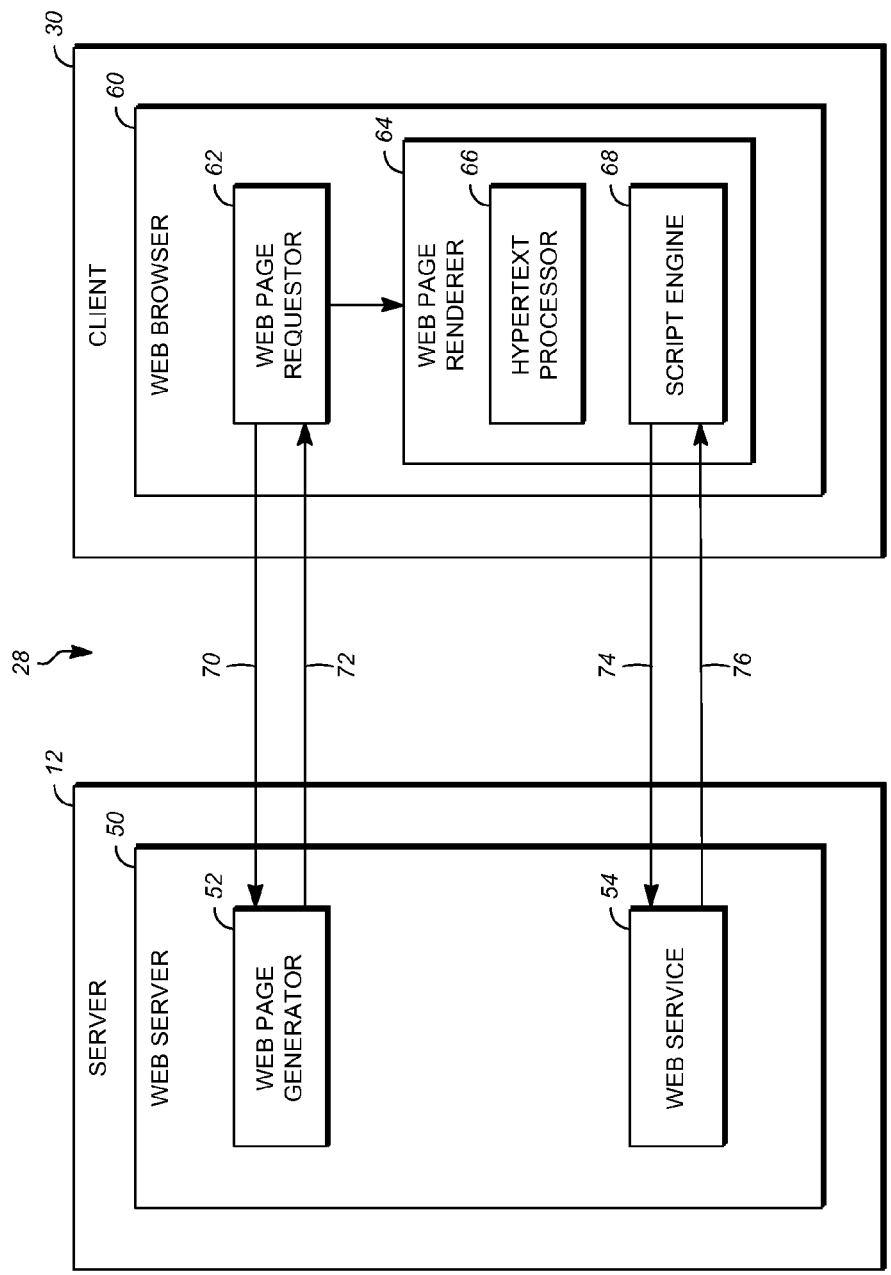
FIG. 2 is a block diagram of a web-based system implemented within the client-server computing scheme of FIG. 1 according to embodiments of the disclosed subject matter.

FIG. 2 is a block diagram of a web-based system implemented within the client-server computing scheme of FIG. 1. The web-based system includes a web server 50 implemented on server 12. Web server 50 includes a web page generator 52 and a web service 54. The web-based system also includes a web browser 60 implemented on client 30. Web browser 60 includes a web page requestor 62 and a web page renderer 64. The web page renderer 64 includes a hypertext processor 66 and a script engine 68.

Web page requester 62 is configured to make a page request 70 to web page generator 52 for a web application. The web page generator 52 generates the web application and returns it to web page requester 62 via a response 72. Web page generator 52 can access the web application from a disk on server 12. Alternatively, web page generator 52 can generate some or all of the web application based on page request 70 and/or a database or other data source in server 12 or group of servers 17. In one example, the web application can be a mobile webmail application for providing access to e-mail on a client that is a mobile device.

Once the web application is received by web page requester 62 it is passed to a web page renderer 64. Hypertext processor 66 is used to process hypertext included in the web application so that it can be rendered to display 36 via web browser application window 38. Script engine 68 is used by web page renderer 64 to process instructions included in the web application, such as JavaScript code or CSS.

In one example, the instructions in the web application can include making a background request 74 to web service 54 on web server 50. Web service 54 can process the background request 74 to generate a background response 76. The background response 76 can be utilized by the web application to alter what is displayed on web browser application window 38. Alternatively, the background response 76 can alter the operation of the web application.

In one implementation, the web application can include a hierarchy of nested wrapper elements and display elements. The display elements can include, for example, a network status display element, selection status display element, and a menu display element. Depending on the state of the web application, some, none, or all of these display elements can be visible at any given time in the web browser application window 38 and some, none, or all of display elements can be hidden. Depending on the implementation, any number of display elements may be utilized.

For example, as used in a mobile webmail application, the display elements can be used to display status information to a user. In such an implementation, the network status display element can display whether the mobile webmail application is in an offline status or an online status. The selection status display element can display, for example, a number of e-mail messages that are selected. The menu display element can include buttons for performing actions on the e-mail messages that are selected. The mobile webmail application can be configured to display only active status information. For example, if the mobile webmail application is in the online state, the network status display element can be hidden. In another example, if no e-mail messages are selected, the selection status display element can be hidden. In some circumstances, there may be a delay incorporated before a display element is hidden.

Figure 3:
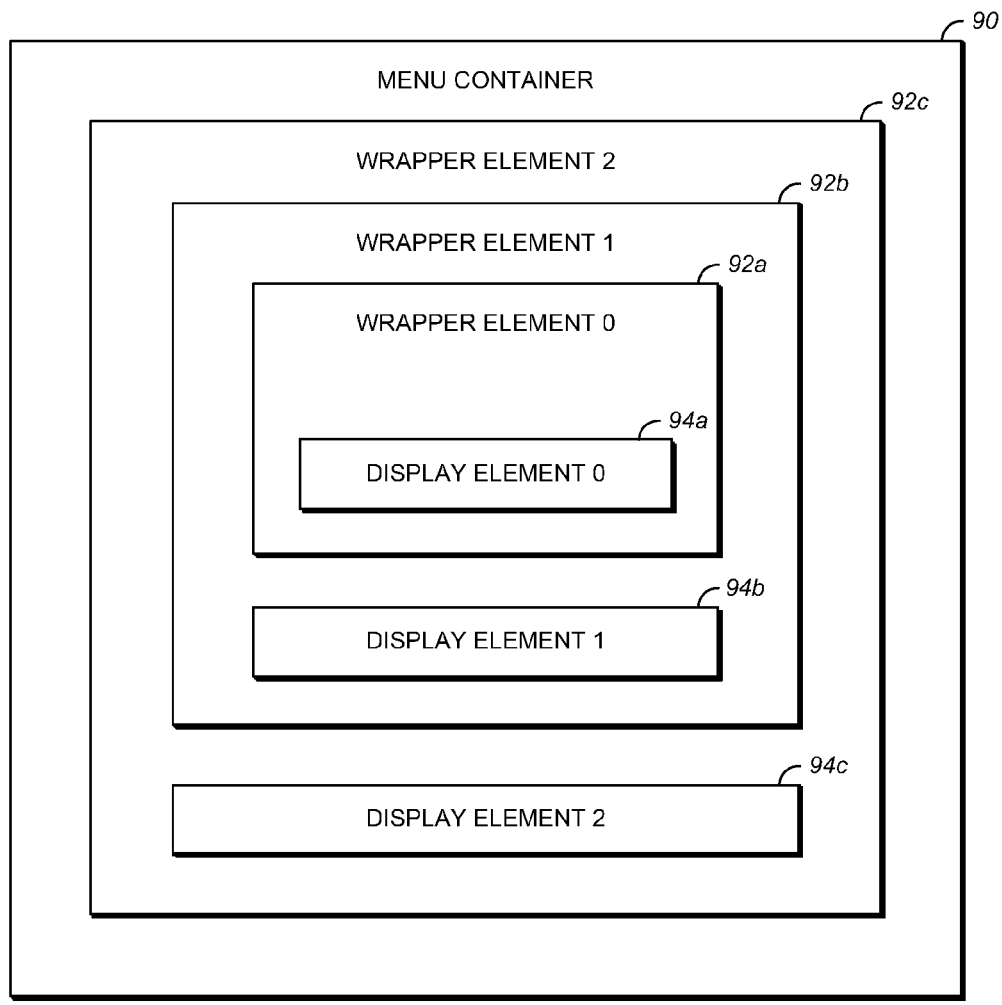
FIG. 3 is a block diagram of a container having nested wrapper elements and display elements within the web-based system of FIG. 2 according to embodiments of the disclosed subject matter.

FIG. 3 is a block diagram of a container 90 having nested wrapper elements 92a-c and display elements 94a-c within the web-based system of FIG. 2. Container 90 includes three display elements 94a-c and three associated nested wrapper elements 92a-c. Wrapper element 2 92c is located at the highest level of the nesting hierarchy. Wrapper element 2 92c includes display element 2 94c. Wrapper element 1 92b is nested within wrapper element 2 92c, and includes display element 1 94b. Wrapper element 0 92a is nested within wrapper element 1 92b, and includes display element 0 94a.

Within the above nesting structure, the z-index of the display elements is decreased for each level of the nesting hierarchy. The z-index refers to the stack order of the various display elements. The z-index of the wrapper elements controls what display element will be visible if multiple display elements occupy the same space in web browser application window 38 (i.e. when display elements overlap). In this example, a display element having a lower z-index will be hidden behind another display element having a higher z-index.

This nesting structure can be utilized to hide any display element simply by translating its associated wrapper element by the height of that display element. In this example, the heights of all display elements are the same. When a wrapper element is translated, the display element included within that wrapper element and all display elements included in wrapper elements nested within that wrapper element are translated by the height of the display element. Because the z-index of the translated display element is less than the z-indices of the display elements outside of the translated wrapper element, the display element in the translated wrapper element will be hidden behind any display elements outside of the translated wrapper element that the display element in the translated wrapper element overlaps with. Because a translation is used to hide the display element, if there is a group of visible display elements, hiding one of them results in the remaining visible display elements being visibly adjacent to each other without an additional gap left by the hidden display element.

In an alternative example, the heights of the display elements can be different. In the case of a display element that is smaller than a visible display element below it, the smaller display element is hidden completely behind the visible display element. In the case of a display element that is larger than a visible display element below it, a portion of the larger display element is hidden behind the smaller visible display element. The remainder of the larger display element is hidden behind one or more additional visible display elements below the smaller visible display element or is hidden by being outside of the visible area of the application window.

The translation can be done by way of a CSS transform. On some client devices, a CSS transform can be performed more quickly than other methods of CSS positioning by using hardware acceleration functionality. For example, absolute positioning of HTML elements may be less efficient than a CSS transform if the absolute positioning is not hardware accelerated. Alternatively, the translation can be done using JavaScript code—however, such an implementation could be more complex and could require additional maintenance as compared to the CSS transform.

The positioning and hiding of display elements within the above nesting structure is described further in the examples shown in FIGS. 4-7. FIG. 4A is a z-index schematic 100a of the container 90 of FIG. 3 with all display elements 94a-c visible. The display elements 94a-c and wrapper elements 92a-c are shown with respect to a z-axis 104 (representing relative z-index values of the display elements) and an application window portion 106 of web browser application window 38. In this example, all of the display elements 94a-c are visible because none of the display elements 94a-c overlap from the vantage point of application window portion 106.

The display elements 94a-c and wrapper elements 92a-c are not drawn to scale and are intended to convey the relationships between the elements. For example, in some implementations, the wrapper elements 92a-c may not extend beyond their contents (i.e. display elements 94a-c).

Figure 4A:
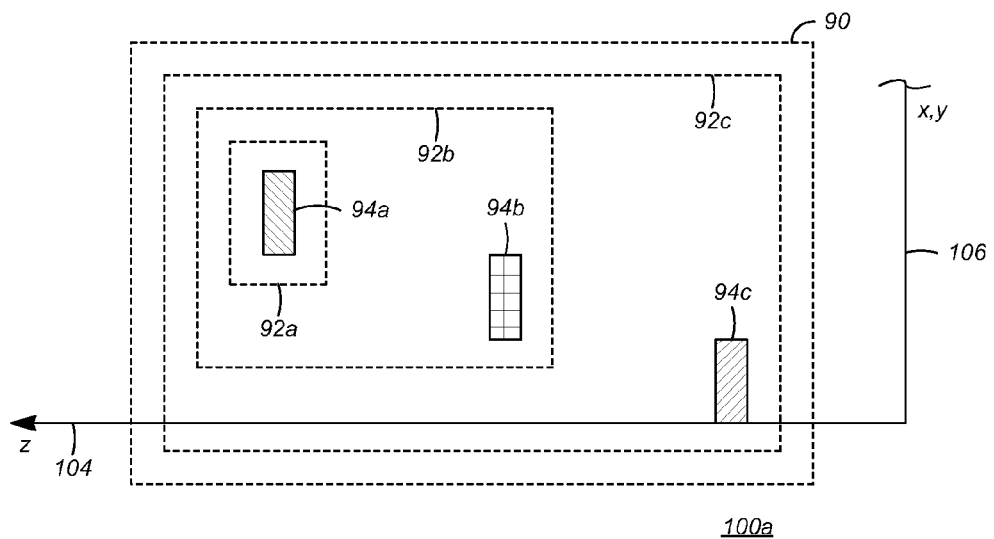
FIG. 4A is a z-index schematic of the container of FIG. 3 with all display elements visible according to embodiments of the disclosed subject matter.
Figure 4B:
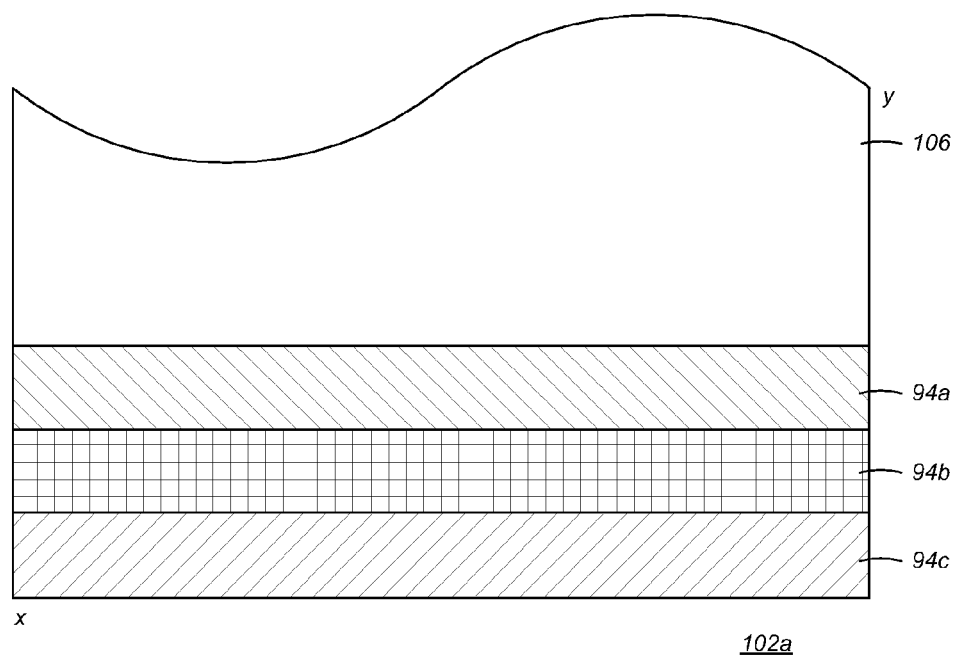
FIG. 4B is a diagram of an application window portion of a web browser application window showing the display elements as configured in FIG. 4A according to embodiments of the disclosed subject matter.

FIG. 4B is a diagram 102a of an application window portion 106 of web browser application window 38 showing the display elements 94a-c as configured in FIG. 4A. In this example, each of the display elements 94a-c are visible because there is no overlap of display elements 94a-c with respect to application window portion 106. In other words, none of the wrapper elements 92a-c have been translated to hide any of the display elements 94a-c.

Figure 5A:
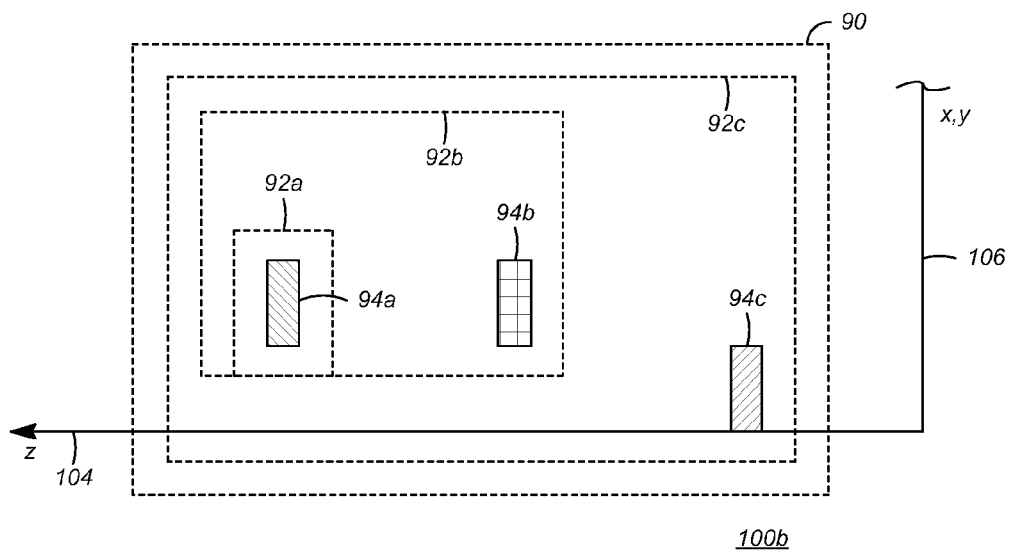
FIG. 5A is a z-index schematic of the container of FIG. 3 with some display elements visible and other display elements hidden according to embodiments of the disclosed subject matter.

FIG. 5A is a z-index schematic 100b of the container 90 of FIG. 3 with some display elements 94b-c visible and other display elements 94a hidden. In this example, wrapper element 92a has been translated down by the height of display element 94a. The translation has moved the display element 94a behind display element 94b with respect to z-axis 104. Thus, display element 94a becomes hidden with respect to application window portion 106.

Figure 5B:
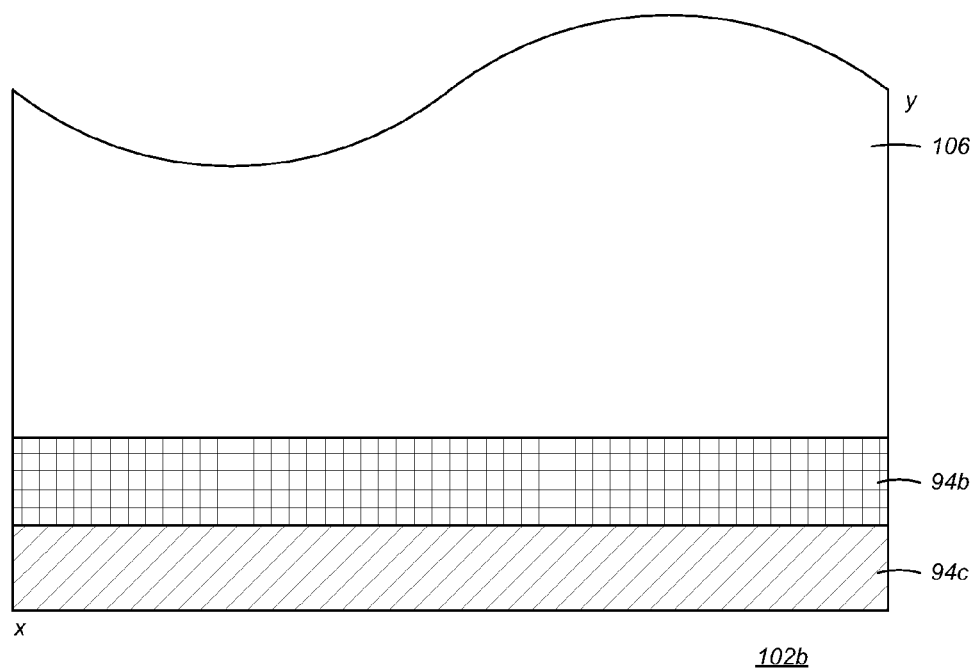
FIG. 5B is a diagram of an application window portion of a web browser application window showing the display elements as configured in FIG. 5A according to embodiments of the disclosed subject matter.

FIG. 5B is a diagram 102b of an application window portion 106 of web browser application window 38 showing the display elements 94a-c as configured in FIG. 5A. In this example, display elements 94b-c are visible and display element 94a is hidden. As shown in z-index schematic 100b, display element 94a is positioned behind display element 94b, hiding it with respect to application window portion 106.

Figure 6A:
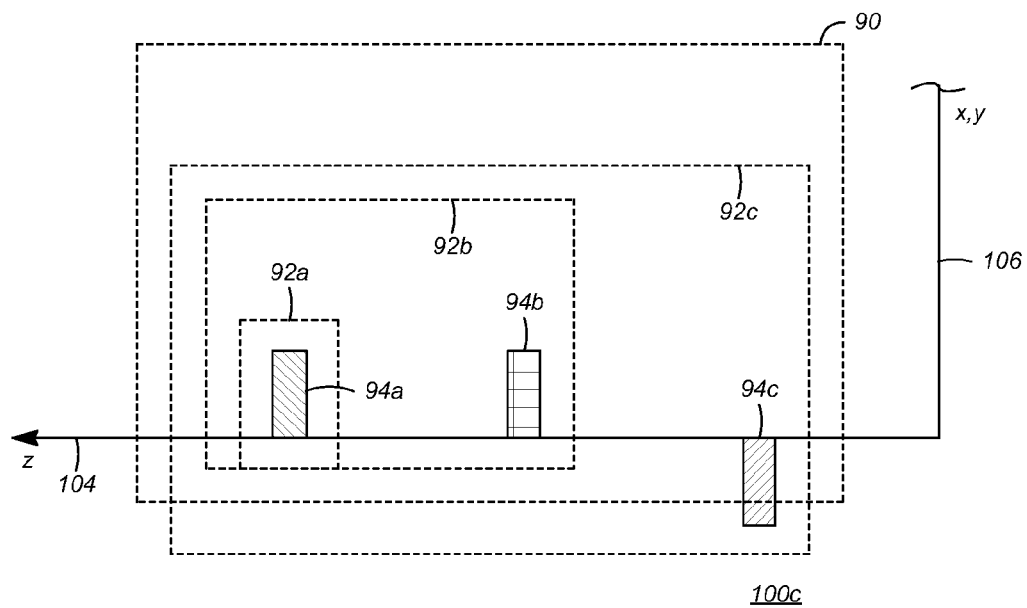
FIG. 6A is a z-index schematic of the container of FIG. 3 with some display elements visible and other display elements hidden according to embodiments of the disclosed subject matter.

FIG. 6A is a z-index schematic 100c of the container 90 of FIG. 3 with some display elements 94b visible and other display elements 94a,c hidden. As compared to z-index schematic 100b, wrapper element 92c has been translated down by the height of display element 94c. The translation of wrapper element 92c moves all elements included within wrapper element 92c because of the nested relationship. Therefore, wrapper elements 92a-c and display elements 94a-c are moved. In this case, display element 94c is moved outside of the viewing area of application window portion 106, hiding it with respect to display 36.

The concurrent movement of the other display elements 94a-b and wrapper elements 92a-b prevent gaps from forming between the remaining visible display element 94b and the bottom of application window portion 106. This example illustrates that in addition to hiding a display element by translation, the nested structure of container 90 also prevents any gaps between display elements when one display element is hidden by translation.

Figure 6B:
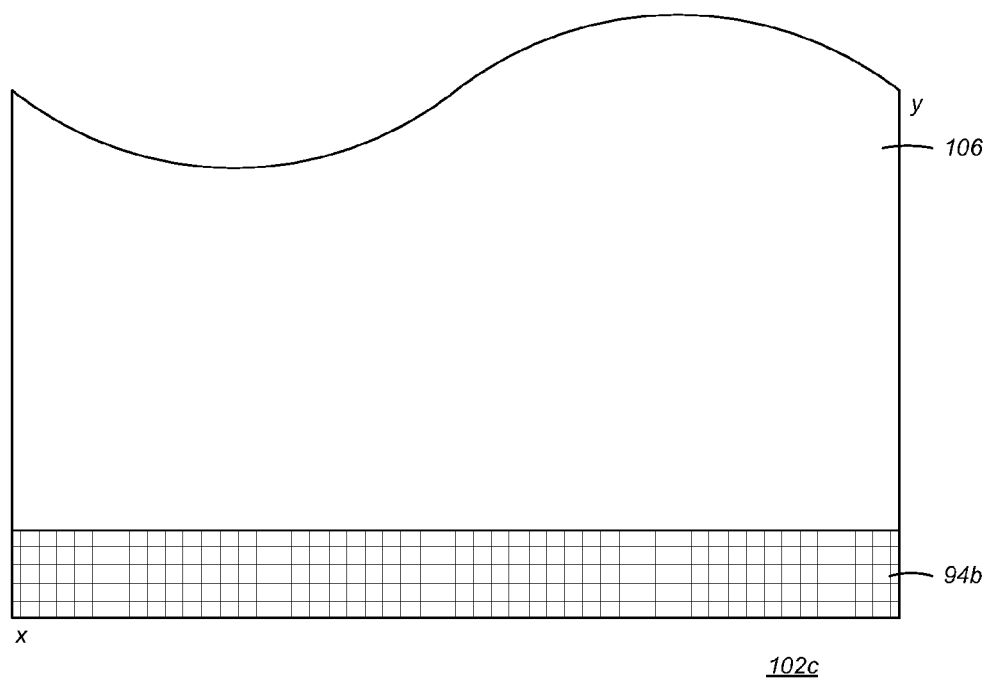
FIG. 6B is a diagram of an application window portion of a web browser application window showing the display elements as configured in FIG. 6A according to embodiments of the disclosed subject matter.

FIG. 6B is a diagram 102c of an application window portion 106 of web browser application window 38 showing the display element 94a-c as configured in FIG. 6A. In this example, display element 94b is visible and display elements 94a,c are hidden. As shown in z-index schematic 100c, display element 94a is positioned behind display element 94b and display element 94c is positioned outside of the viewable area of application window portion 106, hiding these display elements with respect to application window portion 106.

Figure 7A:
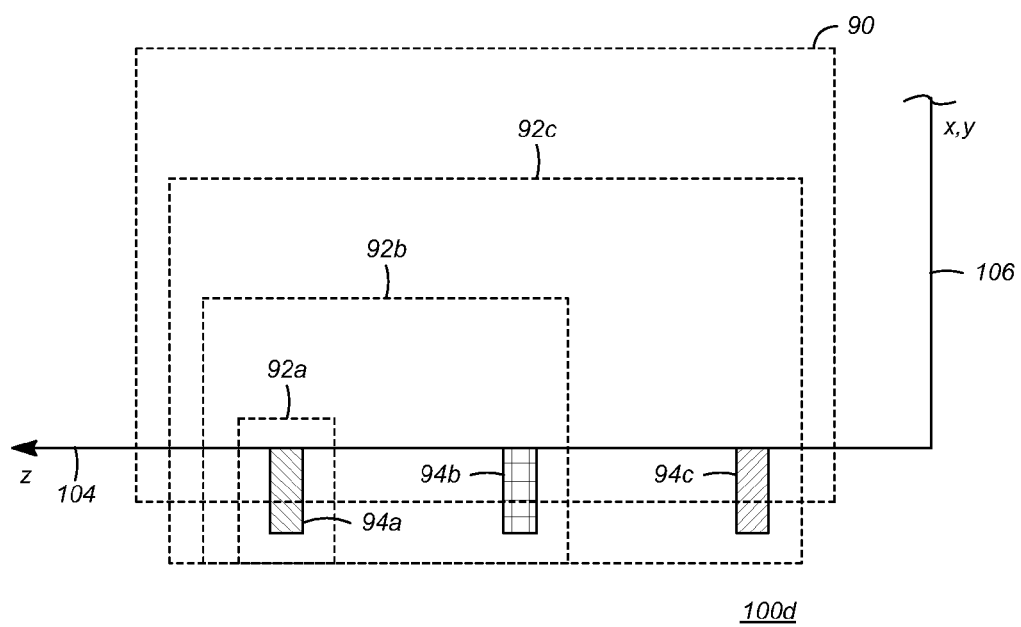
FIG. 7A is a z-index schematic of the container of FIG. 3 with all display elements hidden according to embodiments of the disclosed subject matter.

FIG. 7A is a z-index schematic 100d of the container 90 of FIG. 3 with all display elements 94a-c hidden. As compared to z-index schematic 100c, wrapper element 92b has been translated down by the height of display element 94b. The translation of wrapper element 92b moves all elements included within wrapper element 92b. Therefore, wrapper elements 92a-b and display elements 94a-c are moved. In this case, display elements 94a-b are moved outside of the viewing area of application window portion 106, hiding them with respect to display 36.

Figure 7B:
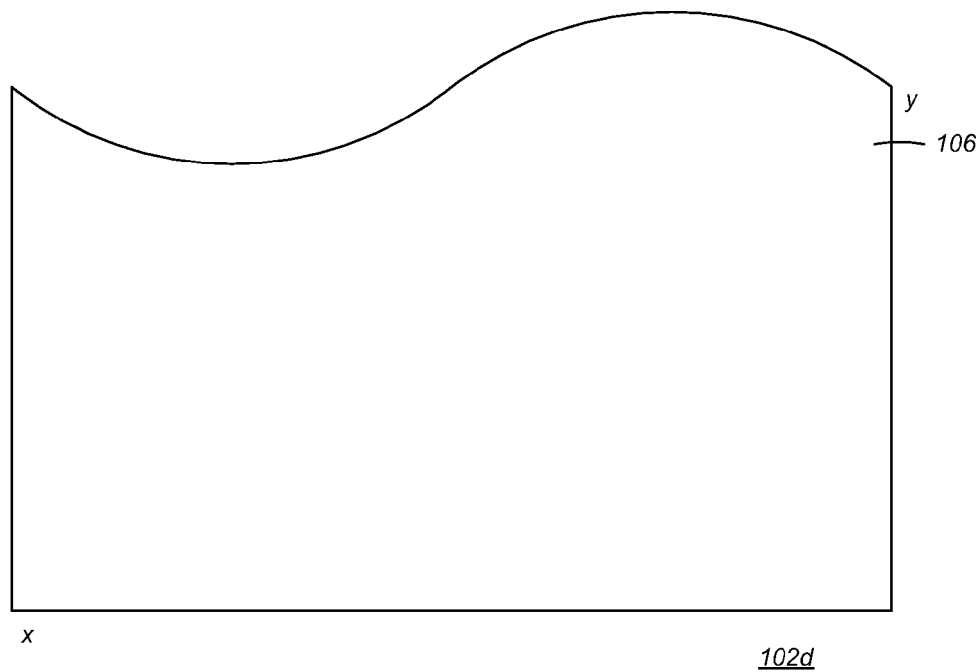
FIG. 7B is a diagram of an application window portion of a web browser application window with all display elements not visible as configured in FIG. 7A according to embodiments of the disclosed subject matter.

FIG. 7B is a diagram 102d of an application window portion 106 of web browser application window 38 with all display elements 94a-c hidden as configured in FIG. 7A. In this example, display elements 94a-c are hidden. As shown in z-index schematic 100d, display elements 94a-c are positioned outside of the viewable area of application window portion 106, hiding these display elements with respect to application window portion 106.

Alternative implementations, including variations of the above described nested wrapper element structure, are contemplated. In one alternative implementation, the wrapper elements and display elements can be restructured such that the display elements corresponding with the visible subset of display elements are moved in front of the display elements corresponding to the hidden subset of display elements to hide the display elements in the hidden subset of display elements.

FIG. 8 includes exemplary Hyper Text Markup Language (HTML) and Cascading Style Sheets (CSS) illustrative of one implementation of the container of FIG. 3. HTML listing 120 includes portions of HTML code implementing a nested layout of wrapper elements. The nested layout is contained within a container HTML element 122. Container HTML element 122 includes a CSS class of "MENU." This class can be used to apply CSS styles to the container HTML element.

Container HTML element 122 includes nested layers of wrapper HTML elements 124a-c. Also included within each wrapper HTML element 124a-c is a display HTML element 126a-c. In this implementation, the display HTML elements 126a-c are located after any nested wrapper HTML elements within wrapper HTML elements. For example, display HTML element 126a is located after wrapper HTML element 124b within wrapper HTML element 124a. In this implementation, each of the wrapper HTML elements 124a-c and display HTML elements 126a-c include an individualized CSS class name for each element. However, in an alternative implementation, the wrapper elements or the display elements may share a common CSS class name. For example, the wrapper elements can be controlled by CSS using a unique element identifier instead of a unique CSS class name.

The HTML tags used for container HTML element 122 and wrapper HTML elements 124a-c are "DIV" tags. "DIV" tags are constructed using an opening tag (i.e. <DIV>) and a closing tag (i.e. "</DIV>"). Content and HTML tags between the opening tag and closing tag of an HTML element are included within the HTML element. This structure allows for the nested layers of HTML elements to be constructed. The display HTML elements 126a-c can include content such as text, buttons, images, or other types of content within their opening and closing tags. While "DIV" tags are used in this example, other HTML tags can be alternatively used. Also, other markup languages can also be used, such as eXtensible Markup Language (XML).

CSS listing 130 includes portions of CSS code implementing aspects of the implementation of the wrapper elements and display elements. Controlling a user's ability to click on the container, wrapper elements, and display elements can be necessary, since a CSS transform operation can allow for a portion of some or all of the wrapper elements or display elements to be clickable within the web application window 38 even if the included display elements are not visible. As such, menu style 132 is used to disable the user's ability to generate a click event on anything within container HTML element 122 via the "MENU" class. A user's ability to click on visible display HTML elements 126a-c is restored using display style 134. Display HTML elements that are hidden can be removed from the CSS code included in display style 134 to disable a user's ability to click on the hidden HTML elements.

HTML listing 120 and CSS listing 130 include provisions for three wrapper elements and three display elements. However, any number of wrapper elements and display elements can be utilized. For example, additional wrapper elements and display elements can be inserted at the points indicated by the ellipses included in HTML listing 120 and CSS listing 130. Additionally, some of the wrapper elements and display elements shown may also be omitted.

The embodiments of server 12 and/or client 30 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and client 30 do not necessarily have to be implemented in the same manner.

Further, in one example, server 12 or client 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Server 12 and client 30 can, for example, be implemented on computers in a webmail system. Client 30 can be implemented on a device such as a mobile device (i.e. a cell phone). In this instance, server 12 can exchange HTTP communications with the communications device. Other suitable server 12 and client 30 implementation schemes are available. For example, client 30 can be a personal computer rather than a portable communications device.

Implementations or portions of implementations of the above disclosures can take the form of a computer program product accessible from, for example, a computer-usable or computer-readable medium. A computer-usable or computer-readable medium can be any tangible device that can, for example, contain, store, communicate, or transport the program for use by or in connection with any processor. The medium can be, for example, an electronic, magnetic, optical, electromagnetic, or a semiconductor device. Other suitable mediums are also available. Such computer-usable or computer-readable media can be referred to as non-transitory media, and may include RAM or other volatile memory or storage devices that may change over time.

The exemplary approaches herein have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of positioning a set of display elements on a display, the method comprising:

obtaining a hierarchy of nested wrapper elements, each display element in the set of display elements located within one of the nested wrapper elements, and at least some of the wrapper elements having a parent wrapper element;

identifying a visible subset of display elements selected from the set of display elements and a hidden subset of display elements selected from the set of display elements; and positioning the visible subset of display elements adjacent to each other using a processor by translating the wrapper elements of display elements in at least one of the hidden subset of display elements or the visible subset of display elements by one or more pre-determined distances so that each display element in the hidden subset of display elements becomes positioned at least one of:

(a) behind one or more display elements in the visible subset of display elements, or
(b) outside of a visible area of the display.

2. The method of claim 1, wherein the method is performed by a web browser that is executed on a client.

3. The method of claim 2, wherein the nested wrapper elements and the display elements are hypertext markup language elements.

4. The method of claim 3, wherein the translating is performed using a Cascading Style Sheet transform.

5. The method of claim 4, wherein the client is a mobile device.

6. The method of claim 5, wherein the mobile device includes hardware acceleration functionality for performing the Cascading Style Sheet transform.

7. The method of claim 5, wherein obtaining the hierarchy of nested wrapper elements comprises:
obtaining a web application to be executed within the web browser, the web application including instructions that include the hierarchy of nested wrapper elements.

8. The method of claim 7, wherein the web application is a mobile webmail application and the display elements are usable by the web application to display status information related to the mobile webmail application.

9. The method of claim 8, wherein the visible subset of display elements consist of display elements having active status information.

10. The method of claim 7, further comprising:
sending a background request to a web server implemented on a server;
receiving instructions from the web server to change the display elements included in the visible subset of display elements or to change the content of at least one of the display elements; and
positioning the visible subset of display elements responsive to the received instructions.

11. The method of claim 1, wherein the one or more pre-determined distances are based on the heights of the display elements.

12. A method of generating a web document enabling a client to position a visible set of display elements selected from a total set of display elements on a display, the method comprising:
creating a hierarchy of nested wrapper elements using a processor, at least some of the nested wrapper elements having a parent wrapper element;
locating each display element in the total set of display elements within one of the nested wrapper elements; and
configuring each nested wrapper element having a parent wrapper element so that a display element of the nested wrapper element will be hidden behind a display element of the parent wrapper if both display elements occupy a same position.

13. The method of claim 12, further comprising:
including the hierarchy of nested wrapper elements within a web application accessible through a web server.

14. The method of claim 13, further comprising:
sending the web application to a client responsive to a request made by a web browser on the client.

15. The method of claim 14, further comprising:
receiving a background request from the web browser on the client; and
sending instructions to the web browser on the client to update content included within one or more of the display elements.

16. The method of claim 15, further comprising:
sending instructions to the web browser on the client to change the display elements included in the visible set of display elements.

17. The method of claim 13, wherein the hierarchy of nested wrapper elements are created using hypertext markup language elements.

18. The method of claim 17, wherein the web application includes instructions for positioning the wrapper elements whereby a visible subset of display elements will be visible on a display of the client and a hidden subset of display elements will not be visible.

19. The method of claim 18, wherein the instructions for positioning the wrapper elements include one or more Cascading Style Sheet transforms configured to move the wrapper elements of display elements in the hidden subset of display elements by the height of the display elements whereby the display elements in the hidden subset of display elements will be hidden behind display elements in the visible subset of display elements.

20. A computing system for positioning a set of display elements on a display, the computing system comprising:
at least one memory; and
at least one processor configured to execute instructions stored in the at least one memory to:
obtain a hierarchy of nested wrapper elements, each display element in the set of display elements located within one of the nested wrapper elements, and at least some of the wrapper elements having a parent wrapper element,
identify a visible subset of display elements selected from the set of display elements and a hidden subset of display elements selected from the set of display elements, and
position the visible subset of display elements adjacent to each other by translating the wrapper elements of display elements in at least one of the hidden subset of display elements or the visible subset of display elements by a pre-determined distance so that each display element in the hidden subset of display elements becomes positioned at least one of:
(a) behind one or more display elements in the visible subset of display elements, or
(b) outside of a visible area of the display.

* * * * *